UNITED STATES PATENT OFFICE.

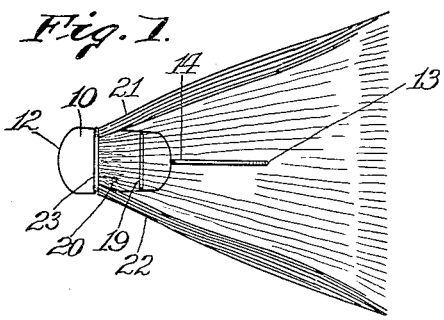
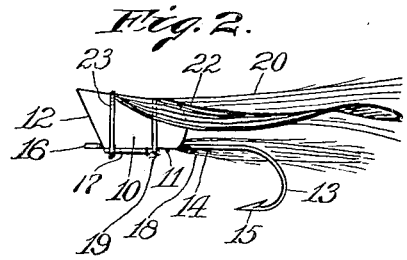
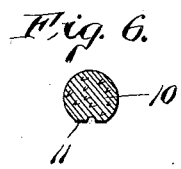
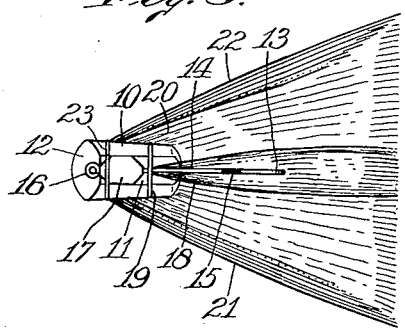
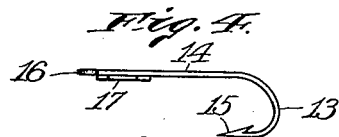

HARRY W. HAYES, OF INDIANAPOLIS, INDIANA.

ARTIFICIAL FLOATING FLY AND HOOK.

1,336,227.  Specification of Letters Patent.  Patented Apr. 6, 1920.

Application filed January 6, 1919. Serial No. 269,785.

*To all whom it may concern:*

Be it known that I, HARRY W. HAYES, a citizen of the United States, residing at Indianapolis, in the county of Marion and State of Indiana, have invented certain new and useful Improvements in Artificial Floating Flies and Hooks, of which the following is a specification.

This invention relates to the art of catching fish by means of a hook and line, the invention having reference more particularly to an artificial or imitation floating fly adapted to carry the fishing hook near to the surface of a body of water and designed to mask the fish hook while attracting the fish thereto.

An object of the invention is to provide an improved artificial floating fly and hook which shall be so constructed as to be efficient and durable yet not be too expensive for general use, and which may be relied upon to float properly so as to carry the fish hook beneath the fly.

Another object is to provide an artificial floating fly which shall be so constructed as to appear to be alive or animated when in use, and particularly when trolling.

With the above-mentioned and other objects in view, the invention consists in a floating fly and hook having novel features of construction; and, in the parts and combinations of parts as hereinafter particularly described and further defined in the accompanying claim.

Referring to the drawings forming a part of this specification, Figure 1 is a top view, Fig. 2 is a side view and Fig. 3 is a bottom view of the artificial floating fly and hook as preferably constructed; Fig. 4 is a side view of the improved fish hook comprised in the invention; and, Fig. 5 is a top view of the improved fish hook; Fig. 6 is a cross sectional view of float 10.

Similar reference characters in the different figures of the drawings indicate corresponding elements or features of construction herein referred to in detail.

In practically carrying out the objects of the invention a suitable float 10 is provided which may be composed of cork or buoyant material and adapted to constitute the body of the artificial fly, the under side of the float or body preferably having a flat face 11. The forward end of the body preferably has an inclined or undercut face 12 slanting downward and rearward so as to cause the body to be forced upward at its forward end when pulled through the water.

An improved fish hook comprised in the invention has a crook 13, a shank 14, a spear point 15 on the crook, and an eye 16 on the end of the shank to which the fishing line may be connected. The shank 14 is embedded in the under side 11 of the float or body 10, and the shank has a flat base plate 17 fixed thereon that rests against the float to prevent the fish hook from being turned over from its proper position. The shank extends rearward beyond the float and the crook extends downwardly so that the spear point is projected forwardly. A tuft or bunch of hairs 18 is arranged about the shank 14 and is designed to mask the shank of the fish hook, and imitate a portion of the body of the fly. A band 19 is placed on the rearward portion of the float 10 and secures the shank and the tuft of hairs to the float, the hairs extending rearward beyond the shank of the hook. Another tuft or bunch of hairs 20 is arranged on the top portion of the float 10 and extends rearward with a fan-like spread, to imitate the webs or wings at the side edges of which small feathers 21 and 22 are arranged so as to imitate the main portions of the wings, which are secured to the float 10 by means of a band 23 which engages the base plate 17 of the fish hook to assist in securing the shank in place.

The hairs are of suitable color and adapted to imitate the natural colors of a fly if desired, camel-hair, badger hair or other animal hair being suitable.

In practical use the artificial fly floats at or near the surface of the body of water and carries the point of the fish hook slightly below the water surface, a fishing line being connected to the shank of the fish hook. If the device be drawn through the water the inclined forward face 12 has a tendency to rise and tilt the device and will again fall slightly when the line is slackened, so that with intermittent pulling the artificial fly is caused to act in an animated manner as is the case also to an extent when the fly is constantly drawn forward, the result being that the fishes are attracted to the apparently live insect and consequently to the fish hook which thus is successfully employed in fishing operations.

Having thus described the invention, what is claimed as new is—

An artificial floating fly and hook comprising a buoyant body having a flat bottom and an inclined forward end, the top of the body projecting beyond the bottom of the body, a fish-hook having a shank embedded in said flat bottom, said shank having a flat base plate secured thereto that engages said flat bottom adjacent to the forward portion thereof, a bunch of hairs arranged about said shank and extending rearward beyond the shank, a band extending about said body and engaging said shank and bunch of hairs, a pair of wings arranged on the top of said body, and a band extending about said body and engaging said base plate and wings.

In witness whereof, I, have hereunto set my hand and seal at Indianapolis, Indiana, this 28th day of December, A. D. one thousand nine hundred and eighteen.

HARRY W. HAYES. [L. S.]